United States Patent
Derra et al.

(12)

(10) Patent No.: US 6,239,556 B1
(45) Date of Patent: May 29, 2001

(54) LONG LIFE DISCHARGE LAMP OPERATING CIRCUIT WITH REDUCED LAMP FLICKER

(75) Inventors: Gunther H. Derra, Aachen; Hanns E. Fischer; Hans G. Ganser, both of Stolberg; Thomas V Krücken, Aachen; Holger Moench, Vaals; Rob Snijkers, Landgraaf, all of (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/464,007

(22) Filed: Dec. 15, 1999

(30) Foreign Application Priority Data

Dec. 17, 1998 (EP) .................................................. 98204287

(51) Int. Cl.⁷ .................................................. H05B 37/00
(52) U.S. Cl. ............... 315/209 R; 315/224; 315/DIG. 5
(58) Field of Search ................. 315/209 R, 291, 315/224, DIG. 5

(56) References Cited

U.S. PATENT DOCUMENTS

5,608,294    3/1997    Derra et al. ..................... 315/224

FOREIGN PATENT DOCUMENTS

4439885A1    5/1996    (DE) .
WO9714275    4/1997    (WO) .

*Primary Examiner*—David Vu

(57) ABSTRACT

A circuit for operating a high pressure discharge lamp comprising input terminals for connection to a supply voltage source, output terminals for connecting the high pressure discharge lamp, and apparatus, coupled to the input terminals, for supplying an alternating lamp current to the high pressure discharge lamp. The lamp current in each period has a mean value Im. At the start of each period, the lamp current is lowered with respect to the mean value Im so as to allow for stable diffuse attachment on the cathodic phase electrode. The circuit is particularly suited for operating a lamp in an optical projection system.

18 Claims, 3 Drawing Sheets

LONG LIFE DISCHARGE LAMP OPERATING CIRCUIT WITH REDUCED LAMP FLICKER

BACKGROUND OF THE INVENTION

This invention relates to a circuit arrangement for operating a high pressure discharge lamp having, during operation, an electrode which is in a cathodic phase, comprising input terminals for connection to a supply voltage source, output terminals for connecting the high pressure discharge lamp, and means, coupled to the input terminals, for supplying an alternating lamp current having successive periods of opposite polarity to the high pressure discharge lamp, the lamp current per period having a mean value Im.

Such a circuit arrangement is known from U.S. Pat. No. 5,608,294. In the known circuit the lamp current at each period is provided with a superposition of a current pulse in a latter part of each period. In the case where a high pressure discharge lamp is operated with an AC current, each electrode of the lamp alternatingly functions as a cathode and as an anode during successive periods of the lamp current. During these successive periods the electrode emitting the lamp current is said to be in the cathodic phase and the other electrode to be in the anodic phase respectively. Because the total amount of current through the lamp is increased at the end of each period of the lamp current by means of the current pulse, the temperature of the electrode is sufficiently raised to increase the stability of the discharge arc. Accordingly, flickering of the high pressure discharge lamp can be substantially suppressed. Due to its flickering suppression properties the circuit arrangement is in particular suitable for operating a high pressure discharge lamp in a projection system like a projection television apparatus.

Lamps operated with the known circuit arrangement unfortunately showed a continuous increase of the arc voltage over an operating time of several hundred hours, which voltage increase appeared to continue when the lamp was experimentally operated for several thousand hours. As a stable luminous output of the lamp which is fairly constant over the life of the lamp is of vital importance for use in a projection system, a continuous arc voltage increase forms a serious draw back in reaching a long lamp life.

SUMMARY OF THE INVENTION

The invention aims to provide a circuit arrangement for operating a high pressure discharge lamp in which the mentioned draw back is counteracted.

According to the invention a circuit arrangement of the kind mentioned in the opening paragraph is for this purpose characterized in that the lamp current at the start of each period is lowered with respect to the mean value Im so as to allow for stable diffuse attack on the cathodic phase electrode. The arrangement has the advantage that during lamp operation the discharge arc has a soft start each period by diffusely attaching both electrodes resulting in a lower electrode load, so making it possible to operate the lamp without flickering over a long time together with a very significant reduction in occurrence of an increase of the arc voltage.

The mean value of the current Im over a period corresponds to the power Pla of the lamp according to the relation Pla=Im*Vla, where Vla is the lamp voltage. Experiments have shown that preferably the mean value of the current over a first part of the period Ie is smaller than the value Im and over a second part of the period a mean current value I2 preferably is larger than Im. This further improves a soft current start at the beginning of each period with a diffuse arc attachment over the first part of the period resulting in a stabilized arc attachment. As a consequence of the current over the second part of the period I2 being larger than Im, the need of an additional current pulse near the end of the period is further reduced.

In a preferred embodiment of the arrangement according to the invention, the period has a time duration tp and the first part of the period a time duration t1 which satisfies the relation $0.05 \leq t1/tp \leq 0.85$. In case of a value of the ratio t1/tp smaller than 0.05 experiments showed no measurable improvement over the prior art. The upper value of the ratio t1/tp depends on a compromise. For the diffuse stable attachment the ratio should be as long as possible. However as the cathode tends to cool during the cathode phase so the current which is emitted with a diffuse stable attachment tends to lower, this comes in conflict with the need for keeping the lamp operating at the requested power rate. So experimentally it was shown that for an increasing current shape in the first part of the period the ratio should preferably be at most 0.5. In the situation of a decreasing current during t1 the maximum ratio can be 0.85. Otherwise it has appeared that for the values of currents Ie and Im a relation should hold which reads $0.3 \leq Ie/Im \leq 0.9$ and preferable satisfies $0.6 \leq Ie/Im \leq 0.8$, resulting in a reduced extra load on the electrode in comparison to the prior art. For current values of Ie>0.9Im no measurable effects have been found. If Ie becomes too low with respect to Im the value of the mean current I2 in the second part of the period must be chosen so high that there exists a serious risk of the occurrence of arc instabilities during the second part of the period, resulting in lamp flickering.

In a further preferred embodiment the current at the start of the period is higher than Ie. In this way there is taken into account in an advantageous way that the cathode temperature lowers during the period and thus correspondingly the current value for which a stable diffuse attachment of the arc holds.

Arc stabilization and therethrough reducing lamp flicker is still further promoted by adding to the lamp current an additional current pulse as known from the prior art. Preferably the lamp current is then provided with a pulse of the same polarity at the end of the period with a value I3 satisfying the relation $I3 \leq 2Im$.

BRIEF DESCRIPTION OF THE DRAWING

The above and further aspects of the invention will be explained in more detail below with reference to a drawing, in which.

DESCRIPTION OF THE PREFERRED EMBODIMENTS

Figure 1:
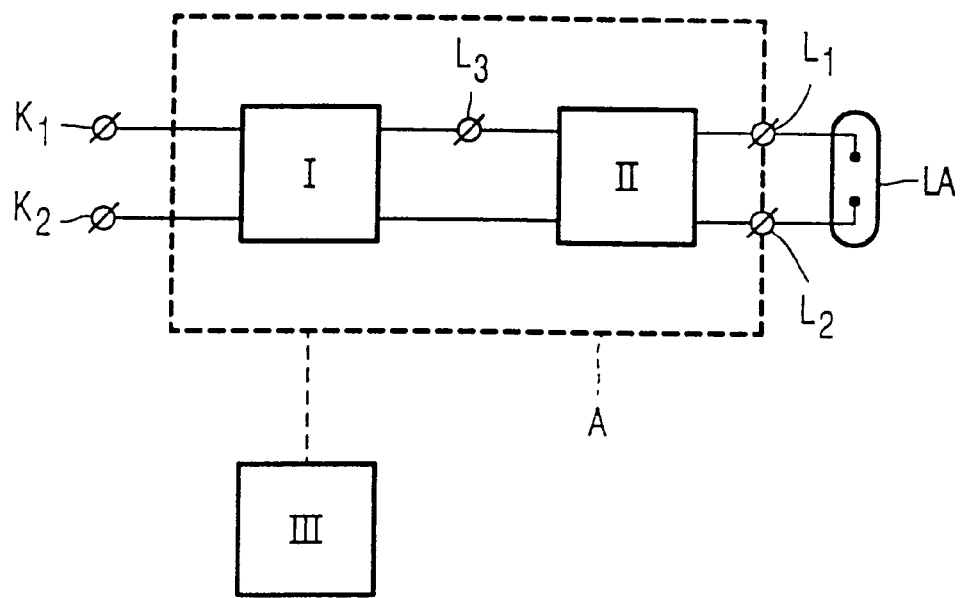
FIG. 1 shows a schematic scheme of a circuit arrangement according to the invention.

In FIG. 1 there are means I for generating a controlled dc supply current having input terminals K1,K2 for connecting to a supply voltage source supplying a supply voltage. Output terminals of means I are connected to respective input terminals of a commutator II. The commutator II is provided with output terminals L1,L2 for connecting a high pressure discharge lamp La. Control means III control the value of the current supplied to the lamp by way of controlling the means I. The means I and the commutator II together constitute means, coupled to the input terminals, for supplying an alternating lamp current having successive periods of opposite polarity, the lamp current per period having a mean value Im.

The operation of the circuit arrangement shown in FIG. 1 is as follows.

When input terminals K1,K2 are connected to a voltage supply source, means I generate a dc supply current from the supply voltage supplied by the voltage supply source. Commutator II converts this dc current into an alternating current having successive periods of opposite polarity. By control means III the value of the current thus formed and supplied to the lamp La is controlled such that the lamp current at the start of each period is lowered with respect to the mean value Im so as to allow for stable diffuse attack on the cathodic phase electrode. In a practical realization of the described embodiment the means I are formed by a rectifier bridge followed by a switch mode power circuit, for instance a Buck or down converter. Commutator II preferably comprises a full bridge circuit. Lamp ignition circuitry is preferably also incorporated in the commutator means II.

Figure 2:
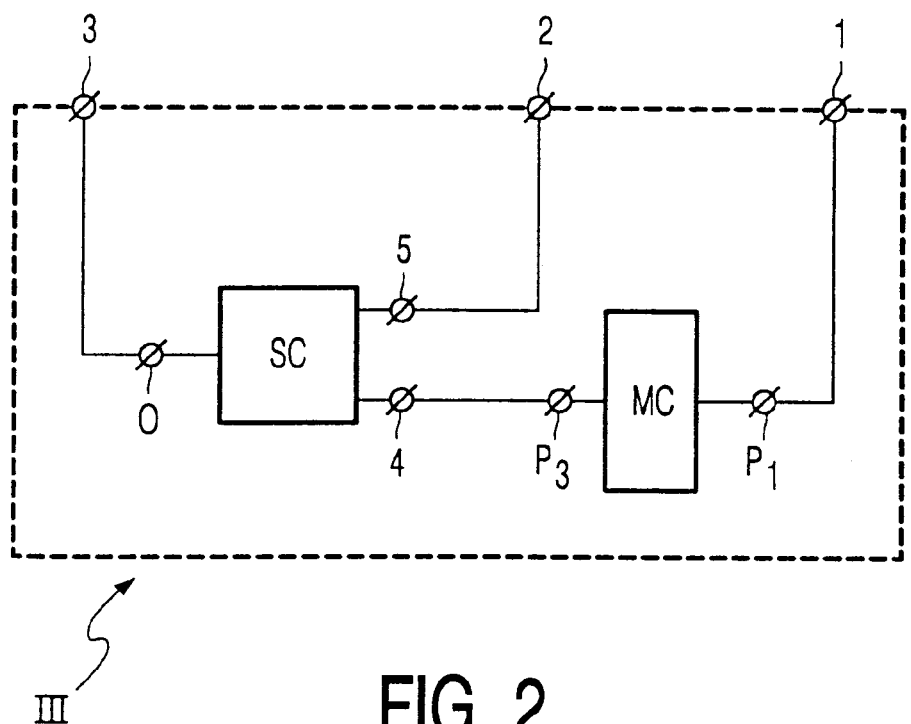
FIG. 2 shows control means of an embodiment of a circuit arrangement according to the invention in accordance with FIG. 1.

In FIG. 2, the control means III for controlling means I are shown in more detail. The control means III comprise an input 1 for detecting the arc voltage, for instance the voltage over the terminals L1,L2 connected to the lamp and forming a signal representing the arc voltage and further called lamp voltage. Preferably the lamp voltage representing signal is formed by detecting a voltage at a connection point L3, as the thus detected voltage is a dc voltage which will not be disturbed by ignition voltages generated in the lamp ignition circuitry. Control means III further comprises, an input 2 for detecting the current through an inductive means L (not shown) of the converter forming the switch mode power circuit of the means I. This converter has at least a switch and an output terminal 3 for switching the switch of the switch mode power circuit periodically into a conducting and a non-conducting state, thus controlling the current through the induction means L of the converter. Input 1 is connected to connection pin P1 of a microcontroller MC. A connection pin P3 of the microcontroller is connected to an input 4 of a switching circuit SC. Input 2 is connected to an input 5 of the switching circuit SC, of which an output O is connected to output terminal 3.

The operation of the circuit arrangement shown in FIG. 2 where the converter is a Buck or down converter, is as follows. The microcontroller MC is provided with software containing a matrix of converter peak current values labeled to lamp voltage, time combinations, wherein the time is counted from the start of each period of the lamp current. A thus found converter peak current value is fed to switching circuit SC at input 4 and is used as reference for comparison with the detected current at input 2 which is also fed to the switching circuit SC, at input 5. Based on this comparison of current values the switching circuit generates a switching off signal at output O, which switches the switch of the down converter into the non-conducting state when the detected current equals the peak current value. As a result the current through the inductive means will decrease. The converter switch is kept in the non-conductive state until the current through the inductive means L becomes zero. On detecting the converter current becoming zero the switching circuit SC generates at its output O a switch on signal that renders the switch of the down converter conductive. The current through the inductive means L now starts to increase until it reaches the peak current value. Such a switching circuit SC is for instance known from WO97/14275. The value of the peak current is refreshed each time the lamp voltage is detected by the control means III.

The detection of the lamp voltage is done at a repetition rate during each period depending on the shape of the current to be realized through the lamp and is controlled by a built in timer of the microcontroller MC. Taking the lamp voltage as the lamp parameter for detection has as an advantage that it makes it possible to have a wattage control of the lamp inherently incorporated in the microcontroller software. In case the lamp current itself is taken as the parameter for detection a wattage control would not only require an additional detection of the lamp voltage, but also an additional control procedure in the microcontroller. The down converter operates in a favourable embodiment at a frequency in the range of 45 kHz to 75 kHz.

Figure 3:
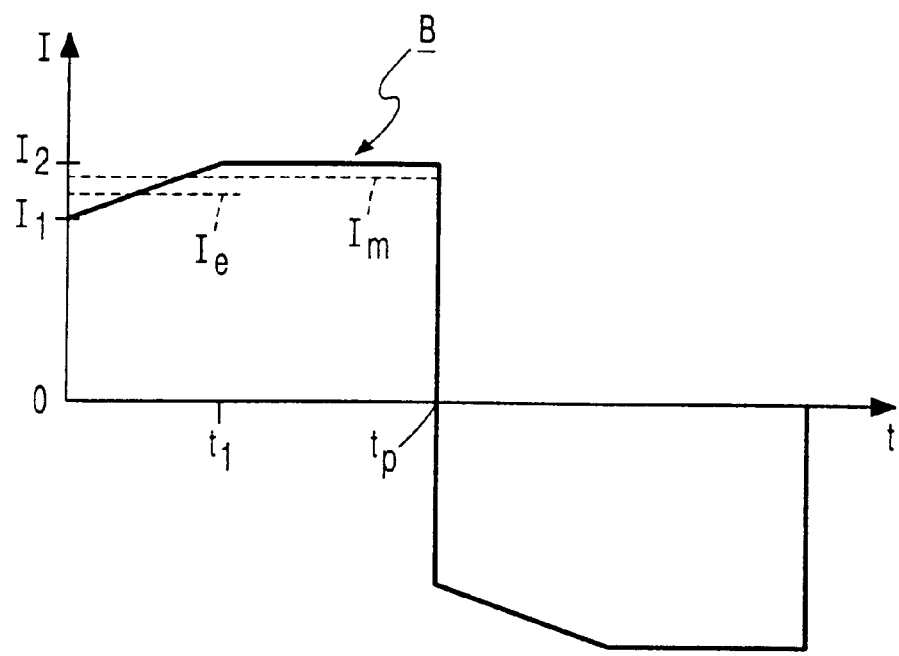
FIG. 3 is a graph of a lamp current provided by the arrangement according to FIG. 1, and FIGS. 4 to 6 are graphs of the lamp current according to several preferred embodiments of the circuit arrangement.

A resulting lamp current as formed in a practical realization of the described practical embodiment of the circuit arrangement according to the invention is shown in the graph of FIG. 3 for 2 successive periods with opposite polarity. The current is set along the vertical axis in a relative scale. Along the horizontal axis the time is displayed. For a first period B of time duration tp the lamp current has a mean value Im and over a first part of the period with the time duration t1 it has a lower mean value Ie and over a second part of the period $t_p$ a constant current having a mean value I2 which is larger than Im. The value of the current I, at the start of the period allows for a diffuse stable arc attachment and so for a thermionic emission of the emitting electrode of the lamp. In the described embodiment the ratio Ie/Im has a value 0.9 and the ratio t1/tp a value 0.5.

Figure 4:
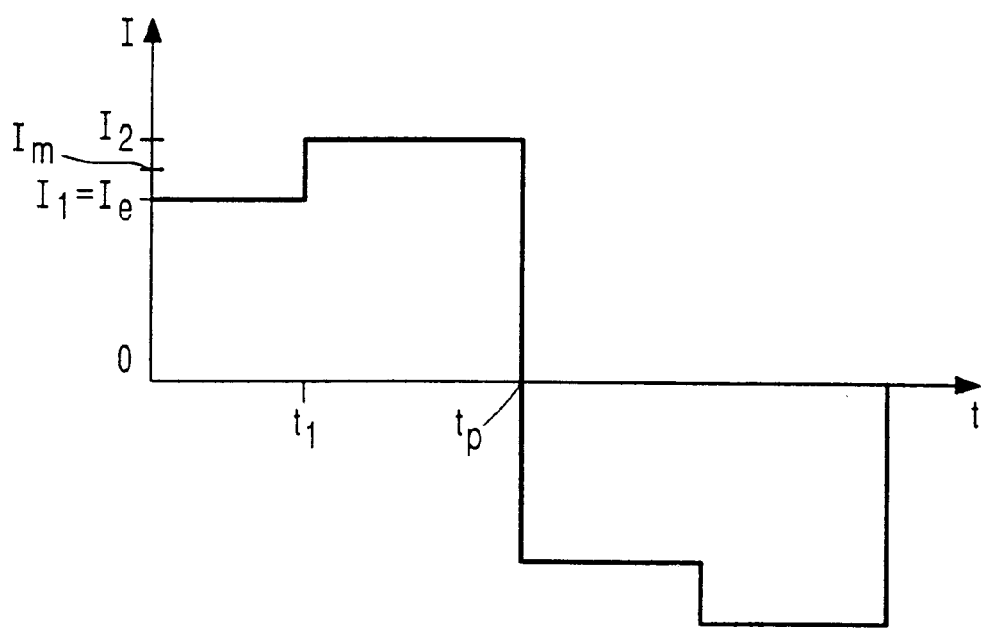

In FIG. 4 is shown the lamp current of an alternative embodiment in which the current over the first part of the period is held constant at a value allowing thermionic emission at the start of the period.

Figure 5:
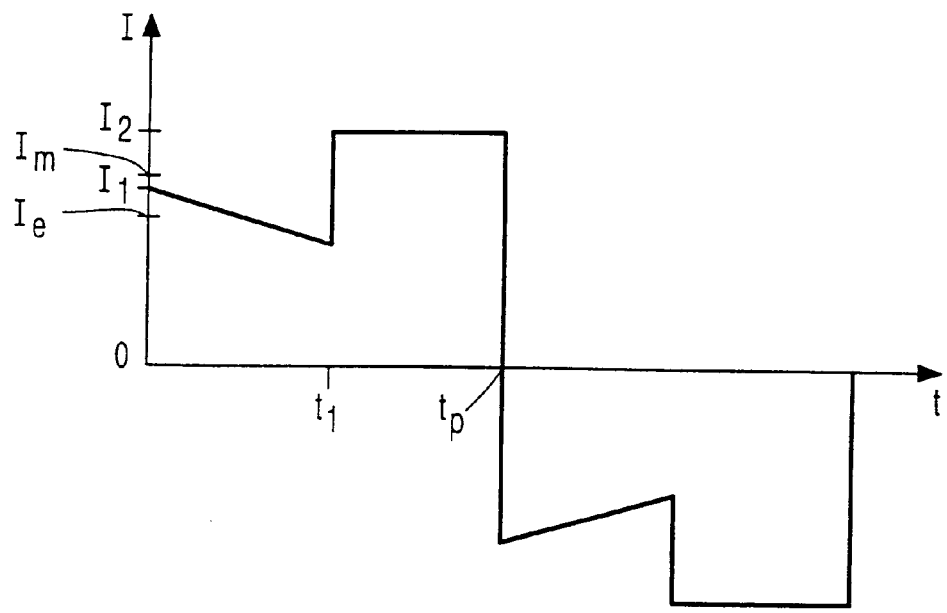

According to a further preferred embodiment, the resulting current is shown in FIG. 5. In this case the current at the start of the period I1 is higher than Ie.

Figure 6:
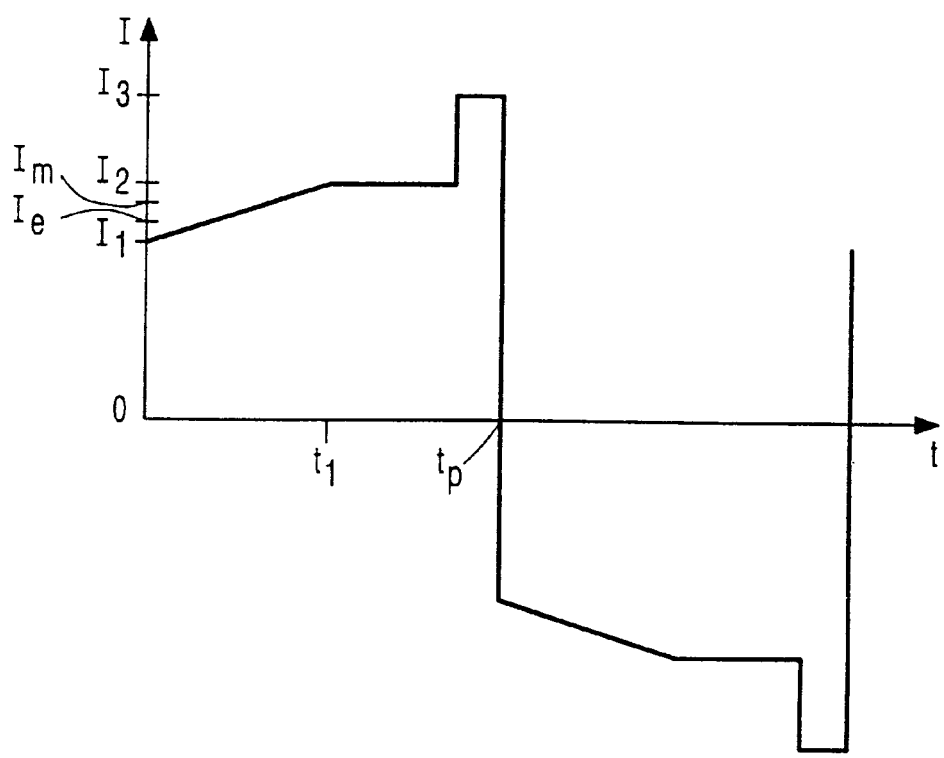

In FIG. 6 is shown a graph of the current according to another preferred embodiment in which the lamp current is provided with a pulse of the same polarity at the end of the period. This pulse has a value I3. In a practical realization of the described embodiment the value of I3 is 1,6 Im.

A practical embodiment of a circuit arrangement as described herein before has been used for the operation of a high pressure discharge lamp of the type UHP, make Philips. The lamp, which had a nominal power consumption of 100 Watt and an electrode distance of only 1.3 mm, was operated with a current according to FIG. 4. The values of the currents are: Ie=0.93 A, Im=1.25 A, I2=1.33 A. So the ratio Ie/Im is 0.74. The period duration tp is 5.6 ms, according to an operating frequency of the commutator means II of 90 Hz, and the ratio t1/tp is 0.2. The microcontroller MC was a P87C749EBP, make Philips and was shown to be suitable. The microcontroller was programmed to detect twice the lamp voltage during each period. In a further practical embodiment wherein a current pulse according to FIG. 6 was superimposed on the lamp current during the latter 8% of each half period, resulting in a current I3 of 1.4*Im, flickering could be substantially suppressed.

The lamp voltage is 85V at 100 hours of the lamp life and showed an increase after 500 hours operation to 94V. For comparison, an identical lamp was operated on a circuit arrangement according to the prior art. In this case the lamp voltage had increased from 85V at 100 hours to 110V after only 300 hours of operation.

What is claimed is:

1. Circuit arrangement for operating a high pressure discharge lamp having, during operation, an electrode which is in a cathodic phase, comprising:

input terminals for connection to a supply voltage source, output terminals for connecting the high pressure discharge lamp, and means, coupled to the input terminals, for supplying an alternating lamp current having successive periods of opposite polarity to the high pressure discharge lamp, each period having a first part and a second part, the lamp current per period having a mean value Im, wherein at the start of each period the lamp current is lowered with respect to the mean value Im so as to allow for stable diffuse attack on the cathodic phase electrode, and the electric energy supplied to the discharge lamp in the second part of each period is greater than the electric energy supplied to the discharge lamp in the first part of each period.

2. Circuit arrangement according to claim 1, wherein the lamp current per period has a mean value Im and over the first part of the period has a lower mean value Ie and over the second part of the period has a mean current I2 that is larger than Im.

3. Circuit arrangement according to claim 1, wherein the period has a time duration tp and the first part of the period has a time duration t1 which satisfies the relation $0.05 \leq t1/tp \leq 0.85$.

4. Circuit arrangement according to claim 1,2, wherein $0.3 \leq Ie/Im \leq 0.9$.

5. Circuit arrangement according to claim 2, wherein current at the lamp start of the period is higher than Ie.

6. Circuit arrangement according to claim 1, wherein the means for supplying an alternating lamp current provides the lamp current with a current pulse of the same polarity as the lamp current at the end of the period and with a value I3 satisfying the relation $I3 \leq 2Im$.

7. The circuit arrangement as claimed in claim 1 wherein the lamp current, in each period thereof, has a mean value Im and over the first part of the period has a lower mean value Ie which satisfies the relation $0.3 \leq Ie/Im \leq 0.9$.

8. The circuit arrangement as claimed in claim 7 wherein the period has a time duration $t_p$ and the first part of the period has a time duration $t_1$ which satisfies the relation $0.05 \leq t_1/t_p \leq 0.85$.

9. The circuit arrangement as claimed in claim 2 wherein the period has a time duration $t_p$ and the first part of the period has a time duration $t_1$ which satisfies the relation $0.05 \leq t_1/t_p \leq 0.85$.

10. The circuit arrangement as claimed in claim 1 wherein the lamp current, in each period, has a mean value Im and over the first part of the period has a lower mean value Ie, and the lamp current at the start of each period is higher than the mean value Ie thereof.

11. A circuit for operating a discharge lamp comprising:

input terminals for connection to a source of supply voltage for the circuit, output terminals for connection to the discharge lamp, and means coupled to the input terminals for supplying to the connected discharge lamp an alternating lamp current having successive periods of opposite polarity, wherein in each period $t_p$ the lamp current has a mean value Im and during a first part $t_1$ of said period has a lower mean value Ie, wherein the relation $0.05 \leq t_1/t_p \leq 0.5$ is satisfied.

12. The operating circuit as claimed in claim 11 wherein for each period of the lamp current, the lamp current satisfies the relation $0.6 \leq Ie/Im \leq 0.8$.

13. The operating circuit as claimed in claim 11 wherein for each period of the lamp current, the lamp current starts initially at a current value below the mean value Ie and increases to a value I2 above the mean value Im, and during a second part of each period has a constant value equal to the value I2.

14. The operating circuit as claimed in claim 11 wherein for each period of the lamp current, the lamp current maintains a constant value $I_1 = I_e$ during the first part $t_1$ of each period and maintains a constant value $I_2 > Im$ during a second part of each period.

15. The operating circuit as claimed in claim 13 wherein the means for supplying an alternating lamp current provides a current pulse to the lamp of the same polarity as the lamp current at the end of the period and with a value I3 satisfying the relation $I3 \leq 2Im$.

16. The operating circuit as claimed in claim 11 wherein for each period of the lamp current, the lamp current satisfies the relation $0.3 \leq Ie/Im \leq 0.9$.

17. The operating circuit as claimed in claim 11 wherein the lamp current at the start of the period is higher than Ie.

18. The operating circuit as claimed in claim 11 wherein the terminal part of each period is devoid of a current pulse.

* * * * *

UNITED STATES PATENT AND TRADEMARK OFFICE
CERTIFICATE OF CORRECTION

PATENT NO. : 6,239,556 B1
DATED : May 5, 2001
INVENTOR(S) : Gunther H. Derra, Hanns E. Fischer, Hans G. Ganser, Thomas V. Krucken, Holger Moench and Rob Snijkers It is certified that error appears in the above-identified patent and that said Letters Patent is hereby corrected as shown below:

Column 5,
Line 33, delete "1".

Signed and Sealed this

Twenty-sixth Day of November, 2002

Attest:

JAMES E. ROGAN
Attesting Officer
Director of the United States Patent and Trademark Office